(12) United States Patent
Kim et al.

(10) Patent No.: US 7,981,551 B2
(45) Date of Patent: Jul. 19, 2011

(54) ELECTROLYTE FOR LITHIUM ION RECHARGEABLE BATTERY AND LITHIUM ION RECHARGEABLE BATTERY COMPRISING THE SAME

(75) Inventors: Cheon Soo Kim, Cheonan-si (KR); Hyung Bok Lee, Seoul (KR); Kwang Sup Kim, Cheonan-si (KR); Sang Ho Lee, Cheonan-si (KR); Joong Heon Kim, Cheonan-si (KR); Tae Shik Earmme, Seoul (KR); Kwang Soo Yeo, Suwon-si (KR); Chan Hee Lee, Asan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1448 days.

(21) Appl. No.: 11/139,981

(22) Filed: May 31, 2005

(65) Prior Publication Data
US 2005/0277027 A1    Dec. 15, 2005

(30) Foreign Application Priority Data

May 31, 2004    (KR) .................. 10-2004-0039171

(51) Int. Cl.
*H01M 6/16* (2006.01)
(52) U.S. Cl. ........ 429/326; 429/328; 429/329; 429/330; 429/339; 429/340
(58) Field of Classification Search .................. 429/326, 429/328, 329, 330, 332, 339, 340
See application file for complete search history.

(56) References Cited

U.S. PATENT DOCUMENTS

| | | | |
|---|---|---|---|
| 5,709,968 A | 1/1998 | Shimizu | |
| 6,074,777 A | 6/2000 | Reimers et al. | |
| 2003/0157413 A1* | 8/2003 | Chen et al. | 429/326 |
| 2004/0048163 A1* | 3/2004 | Park et al. | 429/326 |
| 2004/0053122 A1* | 3/2004 | Sugiyama et al. | 429/144 |
| 2004/0091772 A1 | 5/2004 | Ravdel et al. | |

FOREIGN PATENT DOCUMENTS

| | | |
|---|---|---|
| CN | 1495961 | 5/2004 |
| JP | 02-244565 | 9/1990 |
| JP | 07-114940 | 5/1995 |
| JP | 9-50822 | 2/1997 |
| JP | 09-223516 | 8/1997 |
| JP | 10-255839 | 9/1998 |
| JP | 11-162512 | 6/1999 |
| JP | 11-176472 | 7/1999 |
| JP | 11-233140 | 8/1999 |
| JP | 2001-307768 | 11/2001 |
| JP | 2002-359001 | 12/2002 |
| JP | 2003-257479 | 9/2003 |
| KR | 1020040006781 | 1/2004 |

* cited by examiner

*Primary Examiner* — Patrick Ryan
*Assistant Examiner* — Muhammad Siddiquee
(74) *Attorney, Agent, or Firm* — H.C. Park & Associates, PLC

(57) ABSTRACT

The present invention relates to an electrolyte for a lithium ion rechargeable battery and a lithium ion rechargeable battery including the same. The electrolyte includes a non-aqueous organic solvent, a lithium salt, and triphenyl phosphate. A lithium ion rechargeable battery including the electrolyte has improved overcharge stability and shows excellent chemical properties including reducing swelling, high-temperature storage stability, and cycle life characteristics.

18 Claims, No Drawings

ELECTROLYTE FOR LITHIUM ION RECHARGEABLE BATTERY AND LITHIUM ION RECHARGEABLE BATTERY COMPRISING THE SAME

CROSS REFERENCE TO RELATED APPLICATION

This application claims priority to and the benefit of Korean Patent Application No. 2004-0039171, filed on May 31, 2004, which is hereby incorporated by reference for all purposes as if fully set forth herein.

BACKGROUND OF THE INVENTION

1. Field of the Invention

The present invention relates to an electrolyte for a lithium ion rechargeable battery and a lithium ion rechargeable battery that comprises the electrolyte. In particular, the present invention relates to an electrolyte for a lithium ion rechargeable battery that improves the overcharge stability of a battery and provides excellent electrochemical properties and a lithium ion rechargeable battery comprising the same electrolyte. These electrochemical properties include reducing the swelling of the battery, high-temperature storage stability and cycle life characteristics.

2. Description of the Related Art

As portable electronic devices are rapidly becoming smaller and lighter, the batteries that are used to power them are increasingly required to have a compact size and a large capacity. For example, a lithium ion rechargeable battery has a drive voltage of 3.6 V or more, which is three times higher than the drive voltage of a nickel-cadmium (Ni—Cd) battery or nickel-metal hydride (Ni—MH) battery that is currently used as a power source for a portable electronic device. Further, a lithium ion rechargeable battery has relatively high energy density per unit mass. Therefore, research and development into lithium ion rechargeable batteries are increasing and progressing rapidly.

A lithium ion rechargeable battery comprises a cathode including a lithium-containing metal oxide, an anode including a carbonaceous material that is capable of lithium intercalation/deintercalation, and a non-aqueous electrolyte solution that contains an electrolyte in a non-aqueous solvent.

Lithium rechargeable batteries use a non-aqueous electrolyte because of strong interactions between lithium and water. Such an electrolyte may include a lithium salt-containing solid polymer or a liquid electrolyte containing a lithium salt that is dissociated in an organic solvent. Generally, the organic solvent in which a lithium salt is dissolved may be ethylene carbonate, propylene carbonate, other alkyl group-containing carbonates, and the like. These solvents have boiling points of 50° C. or higher and very low vapor pressure at room temperature.

Lithium rechargeable batteries are classified into two groups including lithium metal batteries and lithium ion batteries that use liquid electrolytes and lithium ion polymer batteries that use solid polymer electrolytes. Lithium ion polymer batteries are further classified into full solid type lithium ion polymer batteries that contain no organic electrolyte solution and lithium ion polymer batteries that use gel type polymer electrolytes that contain an organic electrolyte solution.

When a lithium ion rechargeable battery is overcharged or it experiences an electric short, thermal runaway, during which the battery temperature increases rapidly, may occur. An overcharge or electric short may result from the misuse of a battery or malfunction of a charger, etc. This damage to the battery causes an excessive amount of lithium to be discharged from a cathode and precipitated onto the surface of an anode, thus placing both electrodes in a thermally unstable state. This thermal instability causes thermal decomposition of an electrolyte through reactions between an electrolyte and lithium, oxidation of an electrolyte at a cathode, reactions between oxygen generated from thermal decomposition of a cathode active material and an electrolyte, and the like. These exothermic interactions may cause a rapid increase in battery temperature, or thermal runaway. If the temperature of a battery exceeds a maximum acceptable temperature, an explosion or emission of smoke from the battery may occur.

Many attempts have been made to solve these problems by including various additives in a non-aqueous electrolyte.

Japanese Laid-Open Patent No. Hei 9-50822 discloses a method for ensuring overcharge stability of a battery by adding a benzene compound that comprises a desired substituent, such as an anisole derivative, to a non-aqueous electrolyte of a rechargeable battery. The anisole derivative acts as a redox shuttle in an overcharged battery. As such additives provide good reversibility of redox reactions, they also consume extra electric current caused by overcharge while running between a cathode and an anode.

In addition, Japanese Laid-Open Patent No. Hei 11-162512 discloses a method for ensuring stability of a battery under overcharged conditions by adding a small amount of aromatic compounds such as biphenyl, 3-chlorothiopen, furan, etc., and electrochemically polymerizing them in an abnormal over-voltage state to increase the internal resistance. However, when these aromatic additives are used at temperatures greater than 40° C. or when a relatively high voltage is generated locally during their use under a normal drive voltage, they may decompose gradually during repeated charge/discharge cycles, which results in deterioration of battery characteristics.

SUMMARY OF THE INVENTION

The present invention provides an electrolyte for a lithium ion rechargeable battery that improves the overcharge stability of a battery by preventing a sudden heat generation in an overcharged state. This battery also prevents and improves swelling, high-temperature storage, and cycle life characteristics.

The present invention also provides a lithium ion rechargeable battery that comprises the above-mentioned electrolyte.

Additional features of the invention will be set forth in the description which follows, and in part will be apparent from the description, or may be learned by practice of the invention.

The present invention discloses an electrolyte for a lithium ion rechargeable battery that comprises a non-aqueous organic solvent, a lithium salt, and triphenyl phosphate. The present invention also discloses a lithium ion rechargeable battery that comprises a cathode that includes a cathode active material that is capable of reversible lithium ion intercalation/deintercalation, an anode that includes an anode active material that is capable of reversible lithium ion intercalation/deintercalation, and an electrolyte. The electrolyte comprises a non-aqueous organic solvent, a lithium salt and triphenyl phosphate.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

The present invention improves the overcharge stability of a battery by using triphenyl phosphate as an additive to an electrolyte. Additionally, the resulting electrolyte can provide a battery with excellent high-temperature storage and cycle life characteristics while inhibiting the swelling of a battery.

Triphenyl phosphate is represented by the following Formula 1:

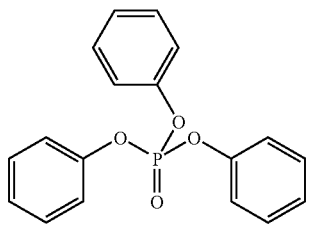

Formula 1

Triphenyl phosphate, which is a kind of phosphoric acid ester, has a flash point of 223° C. and thus is used as a flame retardant. The thermal decomposition of a phosphoric acid ester results in production of polyphosphoric acid. This, in turn, undergoes esterification and dehydrogenation to form charcoal, which serves as an insulator against oxygen and heat. Polyphosphoric acid, which is a type of non-volatile polymer, can form a carbon-based layer that interrupts oxygen and latent heat, thereby inhibiting pyrolysis.

Preferably, triphenyl phosphate is added to an electrolyte in a concentration of about 0.1 to about 10 wt % based on the total weight of electrolyte. The prevention of thermal runway is not likely when the concentration of triphenyl phosphate is less than 0.1 wt %. On the other hand, when the concentration is greater than 10 wt %, the cycle life characteristics of a battery may deteriorate rapidly.

Triphenyl phosphate is added to a non-aqueous organic solvent that comprises a lithium salt. The lithium salt supplies lithium ions which empower a lithium ion rechargeable battery to perform basic fluctions. The non-aqueous organic solvent serves as a medium through which ions participating in chemical reactions of a battery can move.

The lithium salt may include, but is not limited to, $LiPF_6$, $LiBF_4$, $LiSbF_6$, $LiAsF_6$, $LiClO_4$, $LiAlO_4$, $LiAlCl_4$, $LiCF_3SO_3$, $LiN(SO_2CF_3)_2$, $LiC_4F_9SO_3$, $LiN(SO_2C_2F_5)_2$, $LiN(C_xF_{2x+1}SO_2)(C_yF_{2y+1}SO_2)$ (where each of x and y is an integer), LiCl and LiI. Preferably, a lithium salt that has low lattice energy and high dissociation degree and thus shows excellent ion conductivity, thermal stability, and anti-oxidative properties is used.

The concentration of lithium salt in the electrolyte is preferably between 0.6M and 2.0M. When the concentration is less than 0.6M, the conductivity of the electrolyte drops, thereby reducing the electrolyte performance. On the other hand, when the concentration is greater than 2.0M, the electrolyte's viscosity increases, which reduces lithium ion activity and degrades electrolyte performance at low temperatures.

The non-aqueous organic solvent may include carbonates, esters, ethers or ketones, for example. Carbonates that may be used include dimethyl carbonate, diethyl carbonate, dipropyl carbonate, ethylmethyl carbonate, methylpropyl carbonate, ethylpropyl carbonate, ethylene carbonate, propylene carbonate, and butylene carbonate. Esters that may be used include methyl acetate, ethyl acetate, propyl acetate, methyl propionate, ethyl propionate, and γ-butyrolactone. Ethers that may be used include tetrahydrofuran and 2-methytetrahydrofuran. Ketones that may be used include polymethylvinyl ketone.

A carbonate-based solvent comprising a mixture of a cyclic carbonate and a linear chain carbonate is preferably used as a non-aqueous solvent. The volume ratio of the cyclic carbonate to the linear chain carbonate is preferably between 1:1 and 1:9.

The organic solvent is selected to have a high dielectric constant and low viscosity in order to increase the degree of ion dissociation, which facilitates ion conduction. Generally, a mixed solvent comprising at least two components, where one solvent has a high dielectric constant and high viscosity and the other solvent has a low dielectric constant and low viscosity is preferable.

The electrolyte according to the present invention may further comprise an aromatic hydrocarbon-based organic solvent in addition to a carbonate solvent. The aromatic hydrocarbon-based organic solvent may include a compound represented by the following Formula 2:

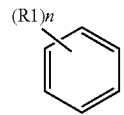

Formula 2 where R1 is a halogen or an alkyl group that has from 1 to 10 of carbon atoms, and n is an integer ranging from 0 to 6.

The aromatic hydrocarbon-based organic solvent may include benzene, fluorobenzene, chlorobenzene, toluene, fluorotoluene, trifluorotoluene, xylene and mixtures thereof. When the electrolyte comprises both an aromatic hydrocarbon-based organic solvent and a carbonate solvent, the volume ratio of the carbonate solvent to aromatic hydrocarbon solvent is preferably between 1:1 and 30:1 in order to enhance the electrolyte performance.

The electrolyte according to the present invention may be applied not only to cylindrical and prismatic batteries in liquid form but may also be used in lithium ion polymer batteries that use a polymer electrolyte.

The polymer electrolyte may further comprise a polymer electrolyte-forming monomer as well as an organic peroxide or an azo-based polymerization initiator in addition to a lithium salt, a non-aqueous organic solvent, and triphenyl phosphate.

The polymer electrolyte-forming monomer may be an acrylate monomer, epoxy monomer, isocyanate monomer or prep olymers of these monomers. The polymer electrolyte-forming monomer is preferably used in concentration of 0.1 to 5 wt % based on the total weight of the electrolyte.

Examples of the organic peroxide may include, but are not limited to, isobutyl peroxide, lauryl peroxide, lauroyl peroxide, dilauroyl peroxide, didecanoyl peroxide, dicumyl peroxide, di-tert-butyl peroxide, benzoyl peroxide, m-toluoyl peroxide, tert-butyl peorxy-2-ethyl hexanoate, tert-butyl peroxy pivalate, tert-butyl peroxy neodecanoate, diisopropyl peroxy dicarbonate, diethoxy peroxy dicarbonate, bis-(4-tert-butyl-cyclohexyl)peroxy dicarbonate, dimethoxy isopropyl peroxy dicarbonate, dicyclohexyl peroxy dicarbonate, 3,3,5-trimethylhexanoyl peroxide, etc.

The azo-based polymerization initiator may include azobisisobutyronitrile (AIBN), azobis (2,4-dimethyl valeronitrile), azobis (cyclohexane carbonitrile), for example.

The organic peroxide or azo-based polymerization initiator has a concentration of about 0.01 to about 1.0 wt % based on the total weight of the monomer or prepolymer used to form the polymer electrolyte. When the concentration is lower than the above range, the polymerization reaction cannot be accomplished. On the other hand, when the concentration exceeds the above range, the battery performance may deteriorate due to the presence of unreacted initiators.

When polymer electrolyte-forming monomers and a polymerization initiator are added to prepare a polymer electrolyte as described above, a solid polymer battery can be fabricated by subjecting an assembled battery to heat treatment or UV irradiation so as to induce polymerization resulting in formation of gel polymers. Such heat treatment is carried out preferably at a temperature of 40° C. to 110° C. and more preferably at a temperature of 60° C. to 85° C.

A lithium ion rechargeable battery that uses the electrolyte according to the present invention comprises a cathode and an anode.

The cathode includes a cathode active material that is capable of reversible lithium ion intercalation/deintercalation. Such cathode active materials include transition metal oxides or lithium chalcogenide compounds. Typical examples of these cathode active materials may include lithium-containing metal oxides such as $LiCoO_2$, $LiNiO_2$, $LiMnO_2$, $LiMn_2O_4$, or $LiNi_{1-x-y}CO_xM_yO_2$ (where $0 \leq x \leq 1$, $0 \leq y \leq 1$, $0 \leq x+y \leq 1$, and M is a metal such as Al, Sr, Mg, La, for example).

The anode includes an anode active material that is capable of lithium ion intercalation/deintercalation. Such anode active materials may include, but are not limited to, crystalline or amorphous carbon, carbonaceous anode active materials formed of carbon composites including pyrolyzed carbon, cokes and graphite, combustion products of organic polymers, carbon fiber, tin oxides, lithium metal and lithium alloys.

A lithium ion rechargeable battery also comprises a separator that is interposed between the cathode and the anode for preventing electric short circuits. A separator may be comprised of any known materials including polymer films formed of polyolefin, polypropylene, polyethylene, etc., multilayer films thereof, microporous films, woven webs and nonwoven webs. The present invention is further explained in more detail with reference to the following examples. It is to be understood that the following examples are illustrative only and the present invention is not limited thereto.

EXAMPLE 1

A tetrapropyltitanate catalyst was added to a mixture of 1M dipentaerythritol, 2M ε-carprolactone, and toluene. The concentration of tetrapropyltitanate was 0.01 wt % based on the weight of the dipentaerythritol. The resulting mixture was heated to 50° C. to synthesize a dipentaerythritol in which a hydroxide group at a terminal end was substituted with ε-carprolactone. Next, 4 moles of acrylic acid and 2 moles of butylcarbonic acid were reacted with 1 mole of the monomer to prepare a polyester hexacrylate-based compound (PEHA) in which four hydroxyl groups (—OH) at the terminal end of the monomer were substituted with —OC(=O)$(CH_2)_5$OC(=O)$CH_2$=$CH_2$, and the remaining two hydroxide groups were substituted with —OC(=O)$(CH_2)_3CH_3$.

1M $LiPF_6$ was added to a mixed organic solvent containing ethylene carbonate, ethylmethyl carbonate, propylene carbonate, and fluorobenzene, in the volume ratio of 30:55:5:10, respectively. Next, 0.5 wt % of the polyester hexacrylate-based compound (PHEA), 0.0033 wt % of dilauroyl peroxide and 1 wt % of triphenyl phosphate were added thereto to obtain an electrolyte.

$LiCoO_2$ as a cathode active material, a conductive agent (Super P manufactured by MMM company) and polyvinylidene fluoride (PVDF) as a binder were combined with N-methyl-2-pyrrolidone (NMP) in a weight ratio of 96:2:2 to form a cathode active material slurry. The slurry was then coated on aluminum foil and dried. Then, the coated aluminum foil was rolled with a roll press to form a cathode plate with a thickness of 0.147 mm.

Graphite as an anode active material and PVDF as a binder were dissolved in NMP to form an anode active material slurry, and the slurry was coated in a copper foil and dried. Then, the coated copper foil was rolled with a roll press to form an anode plate with a thickness of 0.178 mm.

The cathode plate and the anode plate were each cut to a desired size. Next, a separator formed of a porous polyethylene (PE) film was inserted between the electrode plates and the resulting structure was wound to obtain an electrode assembly. The electrode assembly was inserted into a pouch and the pouch was sealed while allowing an inlet for pouring an electrolyte solution. The electrolyte obtained as described above was injected to the pouch through the inlet. Then the inlet was sealed to form a pouch-type cell. The pouch-type cell was heated at about 78° C. for about 4 hours to initiate polymerization of the polyester hexaacrylate-based compound using dilauroyl peroxide.

EXAMPLE 2

Example 1 was repeated except that triphenyl phosphate was added in a concentration of 3 wt %.

EXAMPLE 3

Example 1 was repeated except that triphenyl phosphate was added in a concentration of 5 wt %.

COMPARATIVE EXAMPLE 1

Example 1 was repeated except that 5 wt % of tributyl phosphate was added instead of triphenyl phosphate.

COMPARATIVE EXAMPLE 2

Example 1 was repeated except that triphenyl phosphate was not added.

EXPERIMENTAL EXAMPLE

Five samples of each of the batteries (battery capacity 1 C=70 mAh) obtained in Example 1, Example 2, Example 3 and Comparative Example 1 were charged under a constant current of 158 mA and a constant charging voltage of 4.2 V for 1 hour. Next, each battery was charged again at a current of 395 mA and a charging voltage of 4.2 V.

In order to perform an overcharge test, each of the batteries obtained from Example 1, Example 2, Example 3, and Comparative Example 1 and charged as described above was overcharged under a constant current of 1 C (790 mAh) and constant voltage of 12V for 2.5 hours at room temperature (25° C.). The condition of each battery was tested and the results were shown in the following Table 1.

In addition, a swelling test was performed by charging each battery at a current of 0.5 C (375 mAh) to 4.2V for 3 hours and placing the battery in a chamber at 90° C. for 4 hours. Each battery was tested for a change in thickness to measure swelling. The results are shown in Table 1.

Further, in order to perform a high-temperature storage test, each of the charged batteries was placed in a chamber at 90° C. for 4 days. After 4 days the discharge capacity of each battery at 0.5 C was compared with the discharge capacity of the battery before storage to evaluate high-temperature discharge characteristics. The results are shown in Table 1.

Finally, in order to perform a cycle life test, each battery was charged at a constant current of 1 C and a constant voltage 4.2V and then subjected to 0.1 C cut-off charge and 1 C/3.0V cut-off discharge. Then, each battery was evaluated for life characteristics (capacity retention) at 100 cycles. The results were shown in Table 1.

TABLE 1

| | Additive compound | 1C-12V Overcharge test results | Thickness increase after allowing the cells to stand for 4 days at 90° C. | Capacity retention after allowing the cells to stand for 4 days at 90° C. | Capacity retention after 100 cycles |
|---|---|---|---|---|---|
| Example 1 | TPP 1 wt % | 5L1 OK | 7.2% | 98% | 96.4% |
| Example 2 | TPP 3 wt % | 5L1 OK | 4.7% | 98% | 89.3% |
| Example 3 | TPP 5 wt % | 5L1 OK | 4.4% | 98% | 86.9% |
| Comparative Example 1 | TBP 5 wt % | 5L4 NG | — | — | — |
| Comparative Example 2 | No additive | 2L4, 3L1 NG | 6.5% | 99% | 95.9% |

*Note -
the number preceding "L" indicates the number of tested cells.
The results of the heat exposure test were rated as follow:
L0: good
L1: leakage
L2: flash or flame
L3: smoke
L4: ignition
L5: explosion As can be seen from Table 1, the batteries according to Example 1, Example 2, and Example 3 using triphenyl phosphate show good overcharge stability when compared to Comparative Example 2 that has no additive. Comparative Example 1 that uses tributyl phosphate shows poor overcharge stability.

In addition, the batteries according to Example 2 and Example 3 show excellent swelling properties, capacity retention after high-temperature storage.

It will be apparent to those skilled in the art that various modifications and variation can be made in the present invention without departing from the spirit or scope of the invention. Thus, it is intended that the present invention cover the modifications and variations of this invention provided that they come within the scope of the appended claims and their equivalents.

What is claimed is:

1. An electrolyte for a lithium ion rechargeable battery, consisting of:
   a non-aqueous organic solvent;
   a lithium salt;
   at least one monomer selected from a group consisting of an acrylate monomer, epoxy monomer, isocyanate monomer and prepolymers thereof;
   an organic peroxide or an azo-based polymerization initiator; and
   triphenyl phosphate,
   wherein the triphenyl phosphate has a concentration of 5 to 10 wt %, based on the total weight of the electrolyte.

2. The electrolyte of claim 1, wherein the lithium salt is at least one selected from a group consisting of $LiPF_6$, $LiBF_4$, $LiSbF_6$, $LiAsF_6$, $LiClO_4$, $LiAlO_4$, $LiAlCl_4$, $LiCF_3SO_3$, $LiN(SO_2CF_3)_2$, $LiC_4F_9SO_3$, $LiN(SO_2C_2F_5)_2$, $LiN(C_xF_{2x+1}SO_2)(C_yF_{2y+1}SO_2)$ (wherein, each of x and y is an integer), LiCl and LiI.

3. The electrolyte of claim 2, wherein the lithium salt has a concentration in the range of 0.6M to 2.0M.

4. The electrolyte of claim 1, wherein the non-aqueous organic solvent is at least one selected from a group consisting of a carbonate, an ester, an ether, and a ketone.

5. The electrolyte of claim 4, wherein the carbonate is at least one selected from a group consisting of dimethyl carbonate, diethyl carbonate, dipropyl carbonate, ethylmethyl carbonate, methylpropyl carbonate, ethylpropyl carbonate, ethylene carbonate, propylene carbonate and butylene carbonate.

6. The electrolyte of claim 5, wherein the carbonate solvent is a mixed solvent of a cyclic carbonate and a linear chain carbonate.

7. The electrolyte of claim 4, wherein the non-aqueous organic solvent is a mixed solvent of a carbonate solvent and an aromatic hydrocarbon-based organic solvent.

8. The electrolyte of claim 7, wherein the aromatic hydrocarbon-based organic solvent is an aromatic compound represented by Formula 2:

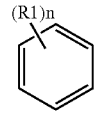

Formula 2 wherein R1 is a halogen atom or an alkyl group having 1 to 10 of carbon atoms, and wherein n is an integer between and including 0 to 6.

9. The electrolyte of claim 8, wherein the aromatic hydrocarbon-based organic solvent is at least one solvent selected from a group consisting of benzene, fluorobenzene, chlorobenzene, toluene, fluorotoluene, trifluorotoluene, xylene, and mixtures thereof.

10. The electrolyte of claim 9, wherein a volume ratio of the carbonate solvent to the aromatic hydrocarbon-based organic solvent is between 1:1 and 30:1.

11. The electrolyte of claim 4, wherein the ether is tetrahydrofuran or 2-methyl tetrahydrofuran.

12. The electrolyte of claim 4, wherein the ester is at least one solvent selected from a group consisting of methyl acetate, ethyl acetate, propyl acetate, methyl propionate, ethyl propionate and γ-butyrolactone.

13. The electrolyte of claim 4, wherein the ketone is polymethylvinyl ketone.

14. The electrolyte of claim 1, wherein the monomer has a concentration of about 0.1 to about 5 wt % based on a total weight of the electrolyte.

15. An electrolyte of claim 1, wherein the organic peroxide has a concentration of about 0.01 to about 1.0 wt % based on a total weight of the monomer.

16. The electrolyte of claim 1, wherein the peroxide is at least one peroxide selected from a group consisting of isobutyl peroxide, lauryl peroxide, lauroyl peroxide, dilauroyl peroxide, didecanoyl peroxide, dicumyl peroxide, di-tert-butyl peroxide, benzoyl peroxide, m-toluoyl peroxide, tert-butyl peorxy-2-ethyl hexanoate, tert-butyl peroxy pivalate, tert-butyl peroxy neodecanoate, diisopropyl peroxy dicarbonate, diethoxy peroxy dicarbonate, bis-(4-tert-butylcyclohexyl) peroxy dicarbonate, dimethoxy isopropyl peroxy dicarbonate, dicyclohexyl peroxy dicarbonate, and 3,3,5-trimethylhexanoyl peroxide.

17. A lithium ion rechargeable battery, comprising:
a cathode including a cathode active material that is capable of reversible lithium ion intercalation/deintercalation;
an anode including an anode active material that is capable of reversible lithium ion intercalation/deintercalation; and
an electrolyte,
wherein the electrolyte consists of:
a non-aqueous organic solvent;
a lithium salt;
at least one monomer selected from a group consisting of an acrylate monomer, epoxy monomer, isocyanate monomer and prepolymers thereof;
an organic peroxide or an azo-based polymerization initiator; and
triphenyl phosphate,
wherein the triphenyl phosphate has a concentration of 5 to 10 wt %, based on the total weight of the electrolyte.

18. The lithium ion rechargeable battery of claim 17, wherein the battery is a lithium ion polymer battery.

* * * * *